United States Patent [19]

Torihata et al.

[11] Patent Number: 4,946,582

[45] Date of Patent: Aug. 7, 1990

[54] METHOD OF REMOVING MERCURY FROM HYDROCARBON OILS

[75] Inventors: Takashi Torihata; Etsuko Kawashima, both of Chiba, Japan

[73] Assignee: Mitsui Petrochemical Industries, Ltd., Tokyo, Japan

[21] Appl. No.: 299,025

[22] Filed: Jan. 19, 1989

[30] Foreign Application Priority Data

| Jan. 22, 1988 | [JP] | Japan | 63-12285 |
| Jan. 22, 1988 | [JP] | Japan | 63-12286 |
| Jan. 22, 1988 | [JP] | Japan | 63-12287 |
| Jan. 22, 1988 | [JP] | Japan | 63-12288 |
| Jan. 22, 1988 | [JP] | Japan | 63-12289 |
| Jan. 22, 1988 | [JP] | Japan | 63-12290 |

[51] Int. Cl.$^5$ .............................................. C106 17/00
[52] U.S. Cl. ............................... 208/251 R; 208/13; 208/253; 208/295; 208/296; 208/299; 208/301; 208/302; 208/303
[58] Field of Search ............... 208/251 R, 253, 295, 208/296, 13, 299, 301, 302, 303, 251 R, 253, 295, 296

[56] References Cited

U.S. PATENT DOCUMENTS

| 2,453,138 | 11/1948 | Kharasch | 208/231 R |
| 3,785,968 | 1/1974 | Whitehurst | 208/251 R |
| 3,793,185 | 2/1974 | Whitehurst et al. | 208/251 R |
| 3,876,934 | 4/1975 | Kasai et al. | 55/68 |
| 3,893,912 | 7/1975 | Zimmerman | 208/295 |
| 3,893,913 | 7/1975 | Zimmerman | 208/253 |
| 4,113,606 | 9/1978 | Mulaskey | 208/244 |
| 4,709,118 | 11/1987 | Yan | 585/820 |

FOREIGN PATENT DOCUMENTS 64-4248 1/1989 Japan .
1231920 9/1989 Japan .

*Primary Examiner*—Helane Myers
*Attorney, Agent, or Firm*—Birch, Stewart, Kolasch & Birch

[57] ABSTRACT

A method of selective and efficient removal of mercury from a hydrocarbon oil comprising contacting said oil with a cupric and/or stannous compound forming a reaction system. The purified hydrocarbon oil can be readily separated from the reaction system. The purified hydrocarbon oil does not contain mercury or any other catalyst poisoning component and can, therefore, be used extensively in catalytic reactions typified by hydrogenation reaction.

6 Claims, 2 Drawing Sheets

METHOD OF REMOVING MERCURY FROM HYDROCARBON OILS

BACKGROUND OF THE INVENTION

Naturally occurring crude oils and other fossil fuels may contain a small amount of mercury depending on the location of their production. Mercury, as an impurity in fuels, is a potential cause of such problems as catalyst poisoning and damage to facilities used in refining, reforming or petrochemical processes. Natural gas and the oils that accompany their production often contain mercury. Several technologies for removing mercury from hydrocarbon gases have been practiced at many commercial NG plants. However, no commercial method for successfully removing mercury from hydrocarbon oils(hydrocarbon liquids) and other oils that are produced in conjunction with the production of natural gas has yet been developed.

The present invention relates to a technology for removing mercury from such hydrocarbon oils. More particularly, the present invention relates to a method for removing mercury selectively and efficiently by utilizing the mechanism of contact with a copper compound and/or a tin compound.

Techniques for removing mercury present as a trace impurity in other substances have been described in numerous reports. In one method, mercury in waste water is removed with the aid of a chelating agent, sulfur, activated carbon, an ion-exchange resin, etc. In another method mercury in waste gases such as combustion gases and air are removed using a molecular sieve, lead sulfide, an alkaline reducing agent, a chelator-supporting activated carbon or an aqueous solution of permanganate. These and other methods known in the art of mercury removal are mostly intended for use in environmental pollution control.

Techniques are also available to remove mercury from natural gas using zeolite or a sulfur-supporting (sulfur-implegnated) activated carbon. However, their availability is limited to hydrocarbons in gaseous form.

As will be understood from the above, disclosures of prior art methods of removing trace mercury from fluids are very scarce. Methods are known for removing trace mercury from vacuum pump oils which comprises using zinc sulfide. However the percentage of mercury that can be removed from hydrocarbon oils by adopting these methods, for all practical purposes is far from being satisfactory. Therefore, a strong need exists for developing a method that is capable of the selective and efficient removal of mercury from hydrocarbon oils.

SUMMARY OF THE INVENTION

The principal object of the present invention is to provide a method by which mercury present in a trace amount in hydrocarbon oils can be removed in a selective and efficient way.

This object of the present invention can be attained by contacting a mercury-containing hydrocarbon oil with either a cupric compound or a stannous compound or both. The cupric compound and/or stannous compound used in the method of the present invention may be in any suitable form, such as a powder, an aqueous solution or an alcoholic solution. If desired, these compounds may be supported on "porous adsorbents" such as activated clay, silica gel, zeolite, molecular sieves, alumina, silica, silica-alumina, and activated carbon.

There also is no limitation on the method of contact to be established between mercury-containing hydrocarbon oils and the $Cu^{++}$ and/or $Sn^{++}$ compounds.

In the course of studies which eventually led to the accomplishment of the present invention, the present inventors conducted the following experiment: sludge was separated by filtration from heavy natural gas liquid (H-NGL) in the same manner, as employed in Example 1 that will be presented later in the present specification and 100 ml of the filtrate was treated with various reagents that were believed to be capable of reading with mercury compounds, in view of such factors as electronegativity (see Table A below for the nomenclatures of these reagents which were used individually in an amount of 1.0 g); after adding these reagents, the respective individual mixtures were stirred well and thereafter left to stand for 1 hour; the concentrations of mercury in the treated solutions were compared with those in the untreated filtrates. The results are also shown in Table A.

TABLE A

Removal of Mercury with Various Reagents

| Reagent | Hg concentration (w/v ppb) Untreated solution | Treated solution | Removal % |
| --- | --- | --- | --- |
| ZnS | 103 | 22 | 78.6 |
| ZnO | 94 | 70 | 25.5 |
| $ZnCl_2$ | 94 | 60 | 36.2 |
| $FeCl_2$ | 94 | 65 | 30.9 |
| $FeCl_3$ | 94 | 26 | 72.3 |
| $SnCl_2$ | 103 | 13 | 87.4 |
| $SnI_2$ | 103 | 2 | 98.1 |
| SnO | 86 | 52 | 39.5 |
| $SnCl_4$ | 103 | 59 | 42.7 |
| $SnO_2$ | 86 | 87 | 0 |
| $PbCl_2$ | 86 | 86 | 0 |
| $Cu_2Cl_2$ | 80 | 53 | 33.8 |
| $CuCl_2$ | 80 | 6 | 92.5 |
| S | 103 | 66 | 35.9 |

As shown in Table A, sulfur which previously proved to be effective in the removal of trace mercury from gases was not as effective for removing trace mercury from hydrocarbon oils in the liquid state.

On the basis of these experimental results, the present inventors found that removal of trace mercury from hydrocarbon oils (liquids) involved a problem that was entirely different from removing mercury from gases. The difference in such factors as the chemical form in which mercury occurred and that the use of specified copper and/or tin compounds was effective for the purpose of removing mercury present in trace amounts in hydrocarbon oils.

The present inventors also found that specified copper and/or tin compounds were capable of having various forms of contact with hydrocarbon oils. The present invention has been accomplished on the basis of these findings.

DETAILED DESCRIPTION OF THE INVENTION

Figure 1:
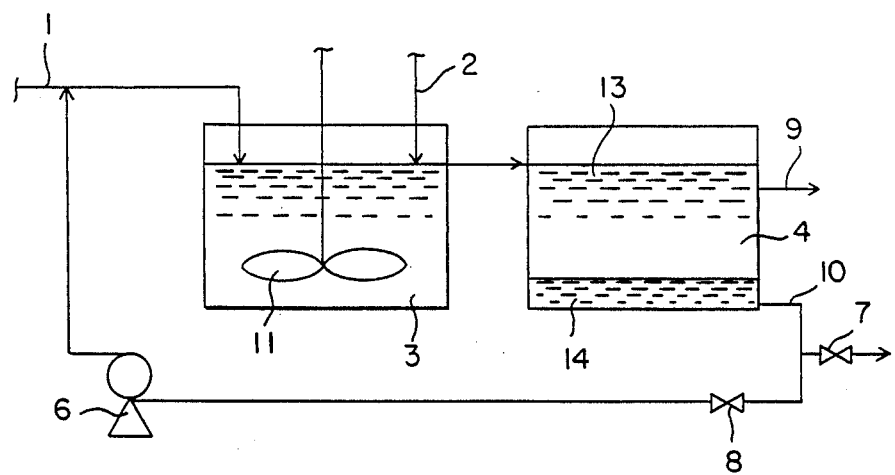
FIG. 1 is a diagram showing a system for practicing the method of the present invention.

The method of the present invention for removing trace mercury from hydrocarbon oils is described hereinafter in detail.

The method of the present invention is applicable to all hydrocarbon oils that are liquids at ordinary temperatures. Illustrative hydrocarbon oils include crude oils, straight run naphtha, kerosene, gas oil, vacuum distillates, atmospheric residues, thermal cracked gasoline obtained as a by-product in the thermal cracking unit of an ethylene plant, heat-treated hydrocarbon oils, naphtha fractions produced in a catalytic cracking unit, and recycled oils. The method of the present invention is particularly suitable for the removal of mercury from a natural gas liquid (NGL) obtained by stripping the natural gas of a liquefied petroleum gas (LPG), especially from a heavy natural gas liquid which contains high-boiling point components.

The mercury to be removed from hydrocarbon oils by the method of the present invention may be present in any form, such as a metallic, inorganic or organic form. The concentration of mercury in hydrocarbon oils is not limited to any particular value, but from the viewpoint of reaction efficiency, the mercury concentration is preferably not more than 400–600 ppb, more preferably up to 100–150 ppb. If necessary, sludge and other solids in the hydrocarbon oil may be removed by the passage thereof through a filtration membrane or some other filtration medium, before the oil is brought into contact with a cupric compound and/or a stannous compound.

Preferred examples of the copper and tin compounds that may be used in the method of the present invention include the following cupric and stannous compounds and mixtures thereof:

(1) Cupric halides Cupric salts such as $CuCl_2$, $CuI_2$ and hydrates thereof are preferred.

(2) Stannous halides Stannous salts such as $SnCl_2$, $SnI_2$ and hydrates thereof are preferred.

The trace Hg containing hydrocarbon oils are preferably contacted by the above-described cupric and stannous compounds under the conditions set forth below.

(1) A solution of cupric or stannous compound is brought into liquid-liquid contact with a hydrocarbon oil. A solution of cupric halide, in particular $CuCl_2$ in HCl, alcohol or water is added to a hydrocarbon oil. The concentration of a cupric compound is typically at least 10 ppm for example, 10 ppm–40 wt %, preferably in the range of 0.5–10 wt %. When a stannous compound is to be used, $SnCl_2$ or some other stannous compound is dissolved in HCl, water or an alcohol in an amount of at least 10 ppm, for example, 10 ppm–40 wt %, preferably 0.5–10 wt %.

(2) A cupric or stannous compound in powder form is added to a hydrocarbon oil. In case of a cupric compound, the powder of a cupric halide such as $CuCl_2$ or a hydrate thereof is brought into contact with a hydrocarbon oil. In case of a stannous compound, the powder of $SnCl_2$, $SnI_2$ or a hydrate of $SnX_2$ (X is a halogen atom) is preferred.

(3) A carrier supporting a cupric or stannous compound is brought into contact with a hydrocarbon oil. Common granular or powdery activated carbon may be used as a carrier. It is also possible to use steam-activated carbon as the carbon. Particularly good results are attained with an activated carbon having a pore size of 10–500 Å, preferably 10–100Å, and a specific surface area of 100–1,500 m²/g, preferably 800–1,200 m²/g. Using an activated carbon having these values of pore size and specific surface area will contribute to an improved efficiency of mercury removal.

The amount of cupric or stannous compounds or a mixture thereof to be supported on an activated carbon is preferably in the range of 0.1–30 wt %, more preferably 1–30 wt % of the carrier (activated carbon).

Carriers other than activated carbon that may be used in the method of present invention include commonly employed granular or powdery activated clay, silica gel, zeolite, molecular sieve, alumina, silica and silica-alumina, which may be used either individually or as admixtures. Particularly good results are attained with carriers having a specific surface area of at least 100 m²/g, preferably 100–1,500 m²/g. Using carriers having these specific surface area values will contribute to an improved efficiency of mercury removal. For the purpose of the present invention, it is more preferable to use these carriers after an acid treatment. The amount of cupric or stannous compounds or a mixture thereof to be supported on carriers other than activated carbon is preferably in the range of 0.1–30 wt % of the carrier.

A cupric or stannous compound that are to be supported on an activated carbon and other carriers is selected from among the following copper or tin species and mixtures thereof. The copper or tin species listed below are believed to occur on a carrier in various forms which include elemental metal, metallic ion, metallic compound, a solvate thereof and a compound containing the water of crystallization. However, details of the chemical form in which copper or tin species occur are not clearly known and the term "cupric" or "stannous" is sometimes used herein to collectively denote these species.

(1) Cupric halides

Preferred examples of cupric halides that may be used in the present invention are cupric halides such as $CuCl_2$ and hydrates thereof. These cupric halides are dissolved in either water or HCl aqueous solution or a suitable solvent which may be inorganic or organic (e.g. acetone or alcohol); the carrier is immersed in the resulting solution and the solvent is removed with an evaporator, followed by drying and firing (if necessary) to prepare a copper-supporting adsorbent.

(2) Stannous halides

Preferred examples of stannous halides that may be used in the present invention are $SnCl_2$, $SnI_2$ and hydrates thereof. These stannous halides are dissolved in water, HCl aqueous solution, an inorganic solvent or an organic solvent such as acetone or alcohol. The carrier is immersed in the resulting solution and the solvent is removed with an evaporator, followed by drying and firing (if necessary) to prepare a tin-supporting adsorbent.

Activated carbon and other carriers on which a cupric and/or stannous compound is supported may be brought into contact with a hydrocarbon oil by various methods of establishing solid-liquid contact using, for example, a fixed, moving or fluidized bed system. Non-limiting examples of reaction equipment that are preferably employed in practicing the present invention are described below.

FIG. 1 shows a system employing reaction vessel 3 furnished with stirrer 11. Reaction vessel 3 is also furnished with a line for supplying feed 1 and a line for supplying $Cu^{++}$ or $Sn^{++}$ compound 2. A fluid can communicate between vessel 3 and sedimentation tank 4 which is furnished with outlets that are respectively connected to product recovery line 9 and mercury processing line 10. Mercury processing line 10 communicates at one end with a mercury processing apparatus (not shown) through valve 7 and at the other end with reaction vessel 3 through valve 8 and pump 6.

Feed 1 such as a hydrocarbon oil is supplied to reaction vessel 3 whereas $Cu^{++}$ or $Sn^{++}$ compound 2 is separately supplied in solution or powder form into vessel 3. The supplied hydrocarbon oil and $Cu^{++}$ or $Sn^{++}$ compound are intimately mixed with stirrer 11 in reaction vessel 3.

The mixture is transferred to sedimentation tank 4 where it is left to stand until it separates into purified solution 13 and mercury-containing phase 14. Purified solution 13 is recovered from tank 4 via product recovery line 9. Mercury-containing phase 14 is discharged to the mercury processing apparatus (not shown) through valve 7. If necessary, the mercury-free liquid phase is recycled by pump 6 to reaction vessel 3 through valve 8.

Figure 2:
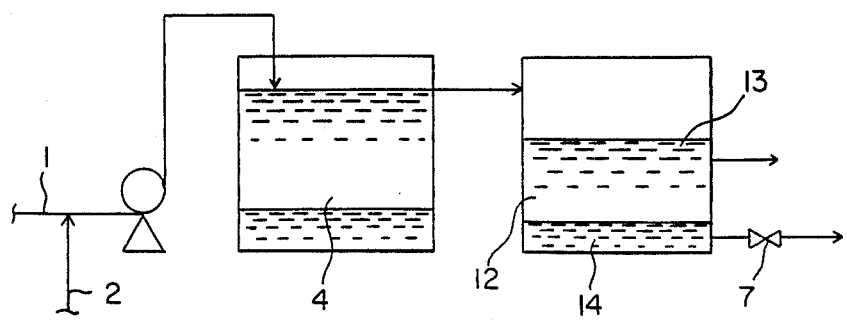
FIG. 2 is a diagram showing another system for practicing the method of the present invention.

FIG. 2 shows a system in which cupric or stannous compound 2 is first mixed with feed 1 before they are transferred to a subsequent stage by means of pump 7. Since feed 1 is further mixed with $Cu^{++}$ or $Sn^{++}$ compound 2 to have intimate contact with the latter as they are pumped, there is no need to employ a reaction vessel equipped with a stirrer as in the case shown in FIG. 1. If necessary, a plurality of sedimentation tanks 4 and 12 may be adopted as shown in FIG. 2 to separate the mixture into purified solution 13 and mercury-containing phase 14 as in the system shown in FIG. 1.

Figure 3:
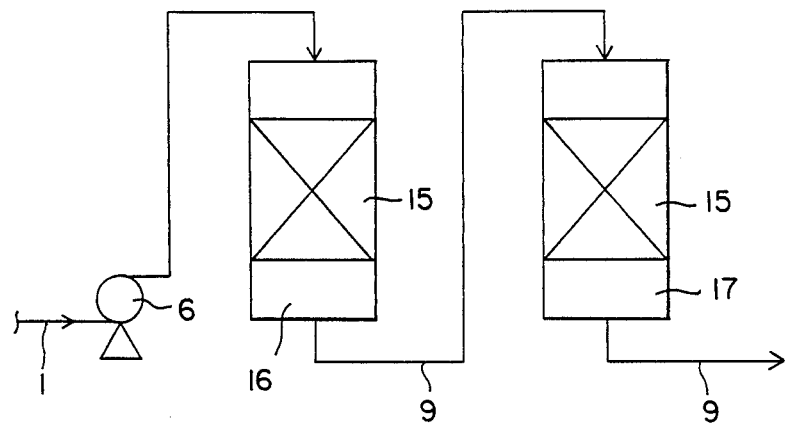
FIG. 3 is a diagram showing still another system for practicing the method of the present invention.

FIG. 3 shows a system that employs adsorption tower 16 and 17 packed with a fixed bed of a $Cu^{++}$ or $Sn^{++}$ supporting adsorbent 15. First adsorption tower 16 is a cylindrical reactor packed in the middle portion with a fixed bed of $Cu^{++}$ and/or $Sn^{++}$ supporting adsorbent 15. It has an inlet on its top through which feed 1 is supplied via pump 6 and is connected at its bottom to product recovery line 9. Preferably, more than two adsorption towers are provided and FIG. 3 shows an embodiment using two adsorption towers, first tower 16 and second tower 17. Feed 1 such as a hydrocarbon oil is supplied to first adsorption tower 16 and as it flows down through the fixed bed of $Cu^{++}$ or $Sn^{++}$ supporting adsorbent 15, mercury present in a trace amount in the hydrocarbon oil is removed by being adsorbed on adsorbent 15. The hydrocarbon oil is transferred to second adsorption tower 17 via product recovery line 9 and is stripped of the remaining mercury through adsorption by the fixed bed of adsorbent 15. In a fixed bed system, the adsorption towers are preferably maintained at a temperature of 10°–40° C., more preferably 20°–30° C. The LHSV (liquid hourly space velocity) is preferably in the range of from 0.5–5.0 $hr^{-1}$, more preferably 0.5–2.0 $hr^{-1}$.

Figure 4:
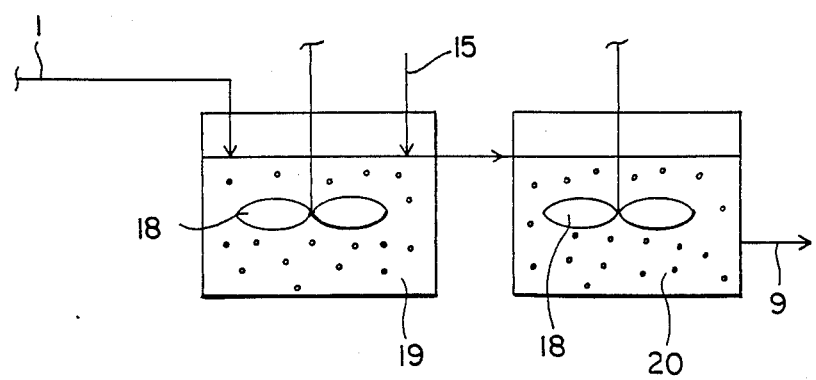
FIG. 4 is a diagram showing a further system for practicing the method of the present invention.

FIG. 4 shows a system furnished with adsorption vessels 19 and 20 each having stirrer 18. Feed 1 such as a hydrocarbon oil is supplied to first adsorption vessel 19 which is also supplied with $Cu^{++}$ and/or $Sn^{++}$ supporting adsorbent 15. Feed 1 and $Cu^{++}$ and/or $Sn^{++}$ supporting adsorbent 15 in vessel 19 make intimate contact with each other as they are agitated with stirrer 18 and the mercury present in a trace amount in the hydrocarbon oil is removed by being adsorbed on $Cu^{++}$ and/or $Sn^{++}$ supporting adsorbent 15.

If feed 1 has a high solids content, sludge and other solid matter are preferably removed with a prefilter or some other suitable device to protect adsorption towers 16 and 17 (FIG. 3) or adsorption vessels 19 and 20 (FIG. 4). Any filtration medium may be employed as long as it is capable of rejecting the solids content of the feed.

The following examples are provided for the purpose of further illustrating the present invention but are in no way to be taken as limiting.

EXAMPLES 1 AND 2

A hundred milliliters of heavy natural gas liquid was filtered through a Millipore ® filter (0.2 μm). The separated sludge had the following composition:

| | |
|---|---|
| Fe | 10.0 wt % |
| Si | 18.3 wt % |
| Hg | 3.1 wt % |
| S | 2.3 wt % |

The filtrate had a mercury content of ca. 130 ppb. To the filtrate, stannous compounds (see Table 1 below) were added in the concentrations also shown in Table 1 and the mixtures were stirred well, followed by standing for 1 hour. The concentrations of mercury in the purified solutions were measured and the results are shown in Table 1.

COMPARATIVE EXAMPLES 1–4

Heavy natural gas liquid was filtered to remove sludge as in Examples 1 and 2. To the filtrates, the compounds shown in Table 1 were added and the mixtures were treated as in Examples 1 and 2. The concentrations of mercury in the purified solutions were measured and the results are shown in Table 1.

TABLE 1

| | Compound (concentration: 1 wt % aqueous solution: 10 ml) | Hg concentration of purified solution (ppb) | Hg removal (%) |
|---|---|---|---|
| Example | | | |
| 1 | $SnCl_2$ | 19 | 85.4 |
| 2 | $SnI_2$ 1.0 g (powder) | 2.7 | 97.9 |
| Comparative Example | | | |
| 1 | $SnCl_4$ | 79 | 39.2 |
| 2 | SnO 1.0 (powder) | 69 | 46.9 |
| 3 | $FeCl_2$ | 97 | 25.4 |
| 4 | $FeCl_3$ | 103 | 20.8 |

EXAMPLES 3 AND 4

Filtrates (100 ml) of heavy natural gas liquid were prepared as in Example 1. To the filtrates, cupric chloride ($CuCl_2$) was added in the amounts shown in Table 2 and the mixtures were stirred well, followed by standing for 1 hour. The concentrations of mercury in the purified solutions were measured and the results are shown in Table 2.

COMPARATIVE EXAMPLES 5–9

Filtrates (100 ml) of heavy natural gas liquid were prepared as in Example 1. To the filtrates, the compounds shown in Table 2 were added and the mixtures were treated as in Example 1. The concentrations of mercury in the purified solutions were measured and the results are shown in Table 2.

TABLE 2

| | Compound in purified solution (ppb) | Hg concentration | Hg removal (%) |
|---|---|---|---|
| Example 3 | CuCl$_2$ | 4.0 | 96.9 |
| Example 4 | CuCl$_2$<br>10 wt % in 10 ml of methanol solution<br>1.0 g (powder) | 8.0 | 93.8 |
| Comparative Example | | | |
| 5 | CuCl<br>10 wt % in 10 ml of methanol solution | 62 | 52.3 |
| 6 | FeCl$_2$<br>1 wt % in 10 ml of aqueous solution | 97 | 25.4 |
| 7 | FeCl$_3$<br>1 wt % in 10 ml of aqueous solution | 103 | 20.8 |
| 8 | CuCl<br>1.0 g (powder) | 71 | 45.4 |
| 9 | PbCl$_2$<br>1.0 g (powder) | 114 | 12.3 |

EXAMPLE 5 AND 6

Filtrates (100 ml) of heavy natural gas liquid were prepared as in Example 1. To the filtrates, 0.8 g of activated carbon ("CAL" of Toyo Calgon Co., Ltd. having a specific surface area of 1050 m$^2$/g and an average pore size 20 Å) which had CuCl$_2$ supported thereon was added and the mixtures were subjected to an adsorption reaction for 1 hour under stirring. The concentrations of mercury in the purified solutions and the percentages of mercury removal are shown in Table 3.

The CuCl$_2$ supporting activated carbon was prepared by the following procedure: activated carbon was submerged in a CuCl$_2$ solution, filtered, and dried in a nitrogen gas at 130° C. for 3 hours. The contents of CuCl$_2$ in the so treated activated carbon are shown in Table 3.

COMPARATIVE EXAMPLES 10–17

The procedures of Examples 5 and 6 were repeated except that the activated carbon supported the compounds shown in Table 3 (in Comparative Example 17, activated carbon was used on its own). The results are shown in Table 3.

TABLE 3

| | Supported compound* | Content of supported compound (percent by weight of the activated carbon) | Hg concentration of purified solution (ppb) | Hg removal (%) |
|---|---|---|---|---|
| Example | | | | |
| 5 | CuCl$_2$ | 10 | 2.9 | 97.8 |
| 6 | CuCl$_2$ | 5 | 16 | 87.7 |
| Comparative Example | | | | |
| 10 | CuCl | 10 | 58 | 55.4 |
| 11 | PbCl$_2$ | 5 | 82 | 36.9 |
| 12 | FeCl$_2$ | 5 | 83 | 36.2 |
| 13 | FeCl$_3$ | 5 | 75 | 42.3 |
| 14 | LiCl | 5 | 85 | 34.6 |
| 15 | NaCl | 5 | 84 | 35.4 |
| 16 | ZnCl$_2$ | 5 | 75 | 42.3 |
| 17 | — | — | 81 | 37.7 |

*Support: activated carbon (CAL) with a specific surface area of 1050 m$^2$/g

EXAMPLES 7 AND 8

Filtrates (100 ml) of heavy natural gas liquid were prepared as in Example 1. To the filtrates, 0.8 g of activated carbon ("CAL" of Toyo Calgon Co., Ltd. having a specific surface area of 1050 m$^2$/g and an average pore size of 20 Å) which had SnCl$_2$ supported thereon was added and the mixtures were subjected to an adsorption reaction for 1 hour under stirring. The concentrations of mercury in the purified solutions and the percentages of mercury removal are shown in Table 4.

The SnCl$_2$ supporting activated carbon was prepared by the following procedure: activated carbon was submerged in a SnCl$_2$ solution, filtered, and dried in a nitrogen gas at 130° C. for 3 hours. The contents of SnCl$_2$ in the so treated activated carbon are shown in Table 4.

EXAMPLE 9

Activated carbon of the same type a used in Examples 7 and 8 was treated with a 10% aqueous solution of SnCl$_2$ to prepare SnCl$_2$ supporting activated carbon, which was packed in an adsorption tower of the same type as adsorption tower 16 shown in FIG. 3. Heavy natural gas liquid (H-NGL) of the same composition as employed in Example 1 was passed through this adsorption tower at SV of 1.5 hr$^{-1}$. The concentration of mercury in the purified solution and the percentage of mercury removal are shown in Table 4.

COMPARATIVE EXAMPLES 18–23

The procedures of Examples 7 and 8 were repeated except that the activated carbon supported the compounds shown in Table 4. The results are shown in Table 4.

TABLE 4

| | Supported compound* | Content of supported compound (percent by weight of the activated carbon) | Hg concentration of purified solution (ppb) | Hg removal (%) |
|---|---|---|---|---|
| Example | | | | |
| 7 | SnCl$_2$ | 3 | 25 | 80.8 |
| 8 | SnCl$_2$ | 5 | 19 | 85.4 |
| 9 | SnCl$_2$ | 10 | 6.7 | 94.8 |
| Comparative Example | | | | |
| 18 | PbCl$_2$ | 5 | 82 | 36.9 |
| 19 | FeCl$_2$ | 5 | 83 | 36.2 |
| 20 | FeCl$_3$ | 5 | 75 | 42.3 |
| 21 | LiCl | 5 | 85 | 34.6 |
| 22 | NaCl | 5 | 84 | 35.4 |
| 23 | ZnCl$_2$ | 5 | 75 | 42.3 |

*Support: activated carbon (CAL) with a specific surface area of 1050 m$^2$/g

EXAMPLES 10 AND 11

A hundred milliliters of heavy natural gas liquid (H-NGL) was filtered through a Millipore® filter (0.2 μm). The separated sludge had the following composition:

Fe 10.0 wt %
Si 18.3 wt %
Hg 3.1 wt %
S 2.3 wt %

The filtrate had a mercury content of 128 ppb. To the filtrate, 0.8 g of activated clay ("Nikkanite 36" manufactured by NIPPON KASSEI HAKUDO K.K.) supporting CuCl$_2$ was added and the mixture was subjected to an adsorption reaction for 1 hour under stirring. The concentrations of mercury in the purified solutions and the percentages of mercury removal are shown in Table 5.

The CuCl$_2$ supporting activated clay was prepared by the following procedure: activated clay was submerged in a CuCl$_2$ solution and after the solvent was removed, the residue was dried in a nitrogen gas at 130° C. for 3 hours. The contents of CuCl$_2$ in the so treated activated clay are shown in Table 5.

EXAMPLE 12

Activated clay of the same type as used in Examples 10 and 11 was treated with a 10% aqueous solution of CuCl$_2$ to prepare CuCl$_2$ supporting activated clay, which was packed in an adsorption tower. Heavy natural gas liquid of the same composition as employed in Example 1 was passed through this adsorption tower at SV of 1.5 hr$^{-1}$. The concentration of mercury in the purified solution and the percentage of mercury removal are shown in Table 5.

COMPARATIVE EXAMPLE 24

The procedures of Examples 10 and 11 were repeated except that CuCl was supported on activated clay. The results are shown in Table 5.

TABLE 5

| | Supported compound* | Content of supported compound (percent by weight of the activated clay) | Hg concentration of purified solution (ppb) | Hg removal (%) |
|---|---|---|---|---|
| Example | | | | |
| 10 | CuCl$_2$ | 10 | 4.7 | 96.3 |
| 11 | CuCl$_2$ | 5 | 13 | 89.8 |
| 12 | CuCl$_2$ | 10 | 6.3 | 95.1 |
| Comparative Example | | | | |
| 24 | CuCl | 10 | 65 | 49.2 |

*Support: activated clay (Nikkanite 36) with a specific surface area of 130 m$^2$/g

EXAMPLE 13 and 14

Filtrated (100 ml) of heavy natural gas liquid were prepared as in Example 1. To the filtrates, 0.8 g of activated clay ("Nikkanite 36" manufactured by NIPPON KASSEI HAKUDO K.K.) which had SnCl$_2$ supported thereon was added and the mixtures were subjected to an adsorption reaction for 1 hour under stirring. The concentrations of mercury in the purified solutions and the percentages of mercury removal are shown in Table 6.

The SnCl$_2$ supporting activated clay was prepared by the following procedure: activated carbon was submerged in a methanol or acetone solution of SnCl$_2$ and after evaporation the solvent, the residue was dried in a nitrogen gas at 130° C. for 3 hours. The contents of SnCl$_2$ in the so treated activated clay are shown in Table 6.

EXAMPLE 15

Activated clay of the same type as used in Examples 13 and 14 was treated with a 10% methanol solution of SnCl$_2$ to prepare SnCl$_2$ supporting activated clay, which was packed in an adsorption tower. Heavy natural gas liquid of the same composition as employed in Example 1 was passed through this adsorption tower at SV of 1.5 hr$^{-1}$. The concentration of mercury in the purified solution and the percentage of mercury removal are shown in Table 6.

COMPARATIVE EXAMPLES 25–31

The procedures of Examples 13 and 14 were repeated except that the activated clay supported the compounds shown in Table 6 (in Comparative Example 31, activated clay was used on its own). The results are shown in Table 6.

TABLE 6

| | Supported compound* | Content of supported compound (percent by weight of the activated clay) | Hg concentration of purified solution (ppb) | Hg removal (%) |
|---|---|---|---|---|
| Example | | | | |
| 13 | SnCl$_2$ | 3 | 24 | 81.3 |
| 14 | SnCl$_2$ | 5 | 16 | 87.5 |
| 15 | SnCl$_2$ | 10 | 7 | 94.5 |
| Comparative Example | | | | |
| 25 | PbCl$_2$ | 5 | 83 | 35.2 |
| 26 | FeCl$_2$ | 5 | 79 | 38.3 |
| 27 | FeCl$_3$ | 5 | 69 | 46.1 |
| 28 | LiCl | 5 | 86 | 32.8 |
| 29 | NaCl | 5 | 87 | 32.8 |
| 30 | ZnCl$_2$ | 5 | 78 | 39.1 |
| 31 | — | — | 87 | 32.0 |

*Support: activated clay (Nikkanite 36) with a specific surface area of 130 m$^2$/g

EXAMPLE 16 and 17

The procedures of Examples 16 and 14 were repeated except that silica gel G (manufactured by WAKO PURE CHEMICAL K.K.) was used as a support in place of activated clay. The results are shown in Table 7.

COMPARATIVE EXAMPLES 32–38

The procedures of Examples 16 and 17 were repeated except that silica gel G (manufactured by WAKO PURE CHEMICAL K.K.) supported the compounds shown in Table 7 (in Comparative Example 38, silica gel G was used on its own). The results are shown in Table 7.

TABLE 7

| | Supported compound* | Content of supported compound (percent by weight of silica gel G) | Hg concentration of purified solution (ppb) | Hg removal (%) |
|---|---|---|---|---|
| Example | | | | |
| 16 | SnCl$_2$ | 3 | 38 | 70.3 |
| 17 | SnCl$_2$ | 5 | 28 | 78.1 |
| Comparative Example | | | | |
| 32 | PbCl$_2$ | 5 | 110 | 14.1 |
| 33 | FeCl$_2$ | 5 | 107 | 16.4 |
| 34 | FeCl$_3$ | 5 | 95 | 25.8 |
| 35 | LiCl | 5 | 116 | 9.4 |
| 36 | NaCl | 5 | 113 | 11.7 |
| 37 | ZnCl$_2$ | 5 | 108 | 15.6 |
| 38 | — | | 114 | 10.9 |

*Support: silica gel G with a specific surface area of 390 m$^2$/g

The method of the present invention has the following advantages. It is capable of selective and efficient removal of mercury from a hydrocarbon oil by bringing a cupric and/or stannous compound into contact with the oil. The purified oil can be readily separated from the reaction system. If desired, a mercury-containing hydrocarbon oil may be brought into solid-liquid contact with an adsorbent supporting a cupric and/or stannous compound. The purified hydrocarbon oil does not contain mercury, therefore, be used extensively in catalytic reactions typified by hydrogenation reaction.

What is claimed is:

1. A method of removing mercury from a hydrocarbon oil comprising contacting said hydrocarbon oil with an adsorbent consisting essentially of a cupric halide or a hydrate thereof, a stannous halide or a hydrate thereof, or a mixture thereof.

2. A method of removing mercury from a sludge-containing hydrocarbon oil comprising
   filtering the sludge-containing hydrocarbon oil to form a sludge-free hydrocarbon oil filtrate and
   contacting said sludge-free hydrocarbon oil filtrate with an adsorbent consisting essentially of a cupric halide or a hydrate thereof, a stannous halide or a hydrate thereof, or a mixture thereof.

3. A method of removing mercury from a hydrocarbon oil comprising contacting said hydrocarbon oil with a solution consisting essentially of an adsorbent and a solvent,
   wherein said adsorbent consists essentially of a cupric halide or a hydrate thereof, a stannous halide or a hydrate thereof, or a mixture thereof, and
   said solvent is selected from the group consisting of HCl, an alcohol, water and a mixture thereof.

4. A method of removing mercury from a hydrocarbon oil comprising contacting said hydrocarbon oil with an adsorbent supported on a carrier,
wherein said adsorbent consists essentially of a cupric halide or a hydrate thereof, a stannous halide or a hydrate thereof, or a mixture thereof, and
said carrier is selected from the group consisting of activated clay, silica gel, zeolite, molecular sieve, alumina, silica, silica-alumina and activated carbon.

5. The method according to claim 4, wherein said carrier is activated carbon.

6. The method according to claim 4, wherein said activated carbon has a pore size of 10–500 Å and a specific surface area of 100–1500 $m^2/g$.

* * * * *